(12) United States Patent
Toutoux et al.

(10) Patent No.: US 11,279,074 B2
(45) Date of Patent: *Mar. 22, 2022

(54) LOCKING FINGER FOR A UNIT FOR MOLDING CONTAINERS MADE OF THERMOPLASTIC MATERIAL

(71) Applicant: SIDEL PARTICIPATIONS, Octeville-sur-Mer (FR)

(72) Inventors: Alexandre Toutoux, Octeville-sur-Mer (FR); Damien Hellouin, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/978,277

(22) PCT Filed: Feb. 26, 2019

(86) PCT No.: PCT/FR2019/050429
§ 371 (c)(1),
(2) Date: Sep. 4, 2020

(87) PCT Pub. No.: WO2019/170976
PCT Pub. Date: Sep. 12, 2019

(65) Prior Publication Data
US 2021/0001535 A1 Jan. 7, 2021

(30) Foreign Application Priority Data

Mar. 7, 2018 (FR) ...................................... 1851980

(51) Int. Cl.
*B29C 49/56* (2006.01)
*B29C 49/48* (2006.01)
(Continued)

(52) U.S. Cl.
CPC .............. *B29C 49/56* (2013.01); *B29C 49/48* (2013.01); *B29C 49/06* (2013.01);
(Continued)

(58) Field of Classification Search
CPC .............. B29C 49/56; B29C 2049/466; B29C 2049/566; B29K 2871/00; B29K 2877/00
See application file for complete search history.

(56) References Cited

U.S. PATENT DOCUMENTS

| | | | | |
|---|---|---|---|---|
| 4,724,251 A | * | 2/1988 | Rock ....................... | C08L 79/08 508/106 |
| 2018/0065290 A1 | * | 3/2018 | Morisse .................. | B29C 49/56 |

FOREIGN PATENT DOCUMENTS

| | | |
|---|---|---|
| DE | 202016101701 U1 | 5/2016 |
| FR | 2646802 A1 | 11/1990 |
| FR | 2945236 A1 | 11/2010 |

OTHER PUBLICATIONS

International search report dated Jun. 12, 2019.

* cited by examiner

*Primary Examiner* — Robert B Davis

(57) ABSTRACT

A locking finger for a molding unit, the molding unit comprising a cavity for molding the container that is at least defined by a first shell fixed on a first mold holder and by a second shell fixed on a second mold holder that can move relative to the first mold holder between an open position and a closed position, the first mold holder comprising a component for controlling the locking finger and the second mold holder comprising a locking opening, the locking finger including an interface for mechanically coupling to the control component, and a locking portion designed to engage with the locking opening in the closed position. The locking portion comprises an anti-friction composite material.

19 Claims, 7 Drawing Sheets

(51) Int. Cl.
*B29C 49/06* (2006.01)
*B29L 31/00* (2006.01)

(52) U.S. Cl.
CPC .......................... *B29C 2049/4892* (2013.01); *B29C 2049/566* (2013.01); *B29K 2871/00* (2013.01); *B29K 2877/00* (2013.01); *B29L 2031/7158* (2013.01)

LOCKING FINGER FOR A UNIT FOR MOLDING CONTAINERS MADE OF THERMOPLASTIC MATERIAL

TECHNICAL FIELD OF THE INVENTION

The invention relates to a locking device for a unit for molding containers made of thermoplastic material.

STATE OF THE ART

The invention relates more particularly to a locking device for a unit for molding containers made of thermoplastic material comprising locking means which comprise at least one locking finger.

As a nonlimiting example, the document FR-2.646.802 describes an example of such a locking device for a container molding unit, in particular for molding bottles.

From the state of the art, it is known practice to provide a lubrication of the locking fingers of such a locking device of a molding unit in order notably to reduce the frictions that occur during locking and consequently the associated wear phenomena.

The lubrication of the locking fingers is performed by applying a pasty or liquid lubricant thereto, such as grease or oil, but such a lubrication presents drawbacks.

The lubrication first of all requires the manufacturing of containers to be stopped to allow for the intervention of an operator, and with a more or less significant frequency.

The lubrication therefore has economic consequences, the down time is all the greater when the number of molding units is high, for example between 20 and 40 units on some so-called rotary blowing machines.

The lubrication is then the source of "soiling" of the container manufacturing environment.

In fact, sprays of lubricant occur notably under the effect of centrifugal force when the molding units equip a rotary blowing machine.

Now, there is generally a search to maintain an ever cleaner container manufacturing environment as evidenced by the many means deployed from the aeraulic protection of the environment to decontamination operations, in particular of the container filling unit.

In the state of the art, the locking means and more particularly the locking fingers, are primarily made of steel or steel alloys.

The metal materials such as steel are, for the person skilled in the art, the only materials that have mechanical properties, notably of strength, that are sufficient given the significant forces to which the locking means are subjected in the transformation of a preform into a container by blow-molding or by stretch-blow-molding in the mold of a molding unit. In fact, the blowing pressures are generally between 20 and 40 bar, the pressure varying as a function of the applications.

That is why the person skilled in the art has sought to remedy the drawbacks associated with the lubrication by seeking surface treatments that can be implemented on metal materials such as the steel used for the manufacturing of the locking fingers.

Surface treatments of the metal locking fingers have thus been provided, in particular the treatment of "DLC" type, DLC being the acronym for "Diamond-Like Carbon".

Such a treatment with carbonized materials consists generally in obtaining, on the outside of the locking fingers, a coating in the form of thin layers deposited by vacuum deposition technologies and intended to improve the properties thereof, notably to reduce frictions and/or increase wear resistance.

Such a "DLC" treatment is not however satisfactory, on the one hand, because lubrication remains necessary (even if the frequency thereof is reduced) and, on the other hand, because such a treatment is particularly costly.

Furthermore, it is difficult to accurately control the dimensions of the locking fingers that have a coating of "DLC" type, which coating is also particularly brittle, notably to impacts.

That is why a solution other than the surface treatments, such as the "DLC" treatment, of the locking fingers, is sought.

The applicant has thus proposed producing the locking fingers in polyetheretherketone or "PEEK", that is to say a thermoplastic material and no longer a metal material such as steel.

However, such a solution does not give full satisfaction. Indeed, the use of such a locking finger made of PEEK is limited to applications for which the blowing pressure does not exceed a pressure of the order of 25 bar.

Such applications correspond generally to the manufacturing of containers that have small thickness, notably bottles such as those used for packaging nongaseous liquid products such as water.

Thus, the locking fingers made of "PEEK" cannot be used for all applications.

Consequently, there is still and always a need to find a solution that also allows for a use of the locking fingers whatever the applications, notably the applications for which the blowing pressure is greater than 25 bar, typically of the order of 30 to 40 bar, or for molding units of large dimensions, generating shear forces on the locking fingers that are very high for one and the same blowing pressure.

The aim of the present invention is notably to resolve the abovementioned drawbacks of the state of the art and to propose a solution that makes it possible to eliminate the lubrication of the locking fingers, in particular while resisting wear in industrial machines for molding containers by blow-molding or stretch-blow-molding.

BRIEF SUMMARY OF THE INVENTION

According to a first aspect, the invention relates to a locking finger for a molding unit, the molding unit comprising a container molding cavity delimited at least by a first shell fixed onto a first mold-holder and by a second shell fixed onto a second mold-holder that can move relative to the first mold-holder between an open position and a closed position, the first mold-holder comprising a member for controlling the locking finger and the second mold-holder comprising a locking opening, the locking finger comprising:
an interface for mechanically coupling to the control member, and
a locking portion designed to cooperate with the locking opening in closed position,
wherein the locking portion comprises an anti-friction composite material.

The inventor has reported that the composite material made it possible to obtain a very high shear and impact strength with a good resistance to wear and the low friction coefficient, and do so despite the very much smaller thicknesses than that provided by the mechanical resistance of an anti-friction material when it is on its own. This advantageous combination provides, in the context of the molding units, a surprising effect of allowing a very good dimensional stability notably because of the small thickness of the composite materials required.

In a first embodiment of the invention according to the first aspect, the locking finger is a subassembly of several mechanical parts rigidly assembled with one another, including:

a main body of the finger comprising the mechanical coupling interface, and said locking portion which is a main sleeve assembled on the main body.

In a second embodiment of the invention according to the first aspect, said locking portion and the mechanical coupling interface both comprise an anti-friction composite material.

The second embodiment according to the first aspect of the invention can optionally notably have the following features taken in isolation or in combination:

the locking portion is a part of a block made of composite material, which block also comprises the coupling interface, the finger comprises at least one insert mounted in the part, notably to increase the shear strength thereof.

According to a second aspect, the invention relates to a locking finger for a molding unit, the molding unit comprising a container molding cavity delimited at least by a first shell fixed onto a first mold-holder and by a second shell fixed onto a second mold-holder that can move relative to the first mold-holder between an open position and a closed position, the first mold-holder comprising a member for controlling the locking finger and the second mold-holder comprising a locking opening, the locking finger comprising:

an interface for mechanically coupling with the control member, and a locking portion designed to cooperate with the locking opening in closed position, the finger being a subassembly of several mechanical parts rigidly assembled with one another, including:

a main body of the finger comprising the mechanical coupling interface, and said locking portion which is a main sleeve made of anti-friction material assembled on the main body.

The inventor has reported that the fact that the portion of the finger (cooperating with the locking opening of the adverse mold door) is a solid sleeve made of anti-friction material providing the surprising effect of, not only avoiding the use of liquid or pasty lubricants, but, in addition, reducing wear because it allows for a better dimensional stability of the locking finger as a whole, in the industrial context of blow-molding machines.

The fact of having a locking finger composed of a sleeve surrounding a main body makes it possible to dedicate the design of the sleeve to the wear resistance and to offer a low friction coefficient, and to dedicate the design of the main body to the impact strength and to the shear forces. The particular "sleeve on main body" arrangement makes it possible to obtain a good dimensional stability that the anti-friction materials on their own do not offer when made of a single piece, and that they also do not offer when they are solely surface deposited.

In a particular embodiment of the invention according to this second aspect, the main sleeve can comprise an anti-friction composite material.

Each of the embodiments according to the first or second aspect of the invention can optionally have the following features taken in isolation or in combination:

said composite material is a composite material with fibers in which fibers are embedded in a matrix of plastic material.

said matrix of plastic material comprises polyetheretherketone (PEEK) and/or polyetherimide (PEI), said fibers are glass fibers or carbon fibers, preferably with a 30% or 40% fiber filling, the composite material is a laminated composite material comprising at least one fabric impregnated with at least one thermosetting resin; preferably, the laminated composite material comprises one or more of the special fabrics, notably in the form of a filament winding, the composite material comprises at least one solid lubricant, the locking finger comprises at least one internal recess which extends over at least a part of the finger so as to reduce the weight thereof.

the main body of the finger is made of metal, in particular of steel or a steel alloy, the main sleeve is disposed at a top end of the locking finger, the locking finger comprising an auxiliary sleeve made of composite material, disposed at a bottom end of the locking finger, the mechanical coupling interface comprises an internal sleeve made of composite material, disposed in an orifice of the main body of the locking finger, said main sleeve and/or said auxiliary sleeve, and/or said internal sleeve have, before assembly with the main body, a solid tubular part, said main sleeve and/or said auxiliary sleeve, and/or said internal sleeve are force-fitted or fixed by gluing, said main sleeve and/or said auxiliary sleeve, and/or said internal sleeve (48) have a chamfer, the composite material has a low friction coefficient by virtue of which all the operations of lubrication of the locking device, notably of the locking means, are eliminated, the composite material used for said at least one sleeve is ORKOT® (registered trademark) marketed by the company Trelleborg. In a nonlimiting manner, ORKOT® is for example chosen from the grades C301 or even C410.

the static friction coefficient of the composite material of said at least one sleeve is less than 0.20, for example of the order of 0.10 for grade C410 ORKOT®, the dynamic friction coefficient of the composite material of said at least one sleeve is less than 0.15, for example of the order of 0.05 for grade C410 ORKOT®, the control member comprises a roller.

By definition, the composite material is a material formed by several individual components, the association of which confers on all properties that none of the components taken separately possesses.

Advantageously, the composite material is a composite material with fibers, that is to say a material in which fibers are embedded in a matrix formed by a plastic material, generally less resistant than the fibers but exhibiting other properties such as a low friction coefficient.

By comparison with the state of the art, the interventions for lubrication of the locking fingers are totally eliminated, by virtue of which any soiling of the container manufacturing environment by sprayed lubricant is notably eliminated.

Advantageously, also eliminated are the costs associated with said previously necessary lubrication interventions, from the costs associated with the stopping of manufacturing to the costs of labor and the purchase costs of the lubricants.

Advantageously, the composite material employed for the manufacturing of said at least one sleeve of the locking finger is a laminated composite material which comprises at least one fabric impregnated with at least one thermosetting resin and at least one solid lubricant, said laminated composite material being, for example, ORKOT®.

BRIEF DESCRIPTION OF THE FIGURES

Other features and advantages of the present invention will become apparent on reading the following detailed description, for an understanding of which reference will be made to the drawings in which.

DETAILED DESCRIPTION OF THE FIGURES

Hereinafter in the description, the longitudinal, vertical and transverse orientations will, in a nonlimiting manner, be adopted with reference to the trihedron (L, V, T) represented in the figures.

By convention, the longitudinal and transverse lines are determined fixedly relative to the mold-holders of a molding unit such that the open or closed position occupied has no impact on said orientations.

Also, in a nonlimiting manner, the terms "front" and "rear" will be used with reference to the longitudinal orientation, as will the terms "top" and "bottom" with reference to the vertical orientation and finally "left" or "right" and "internal" or "external" with reference to the transverse orientation.

Figure 1:
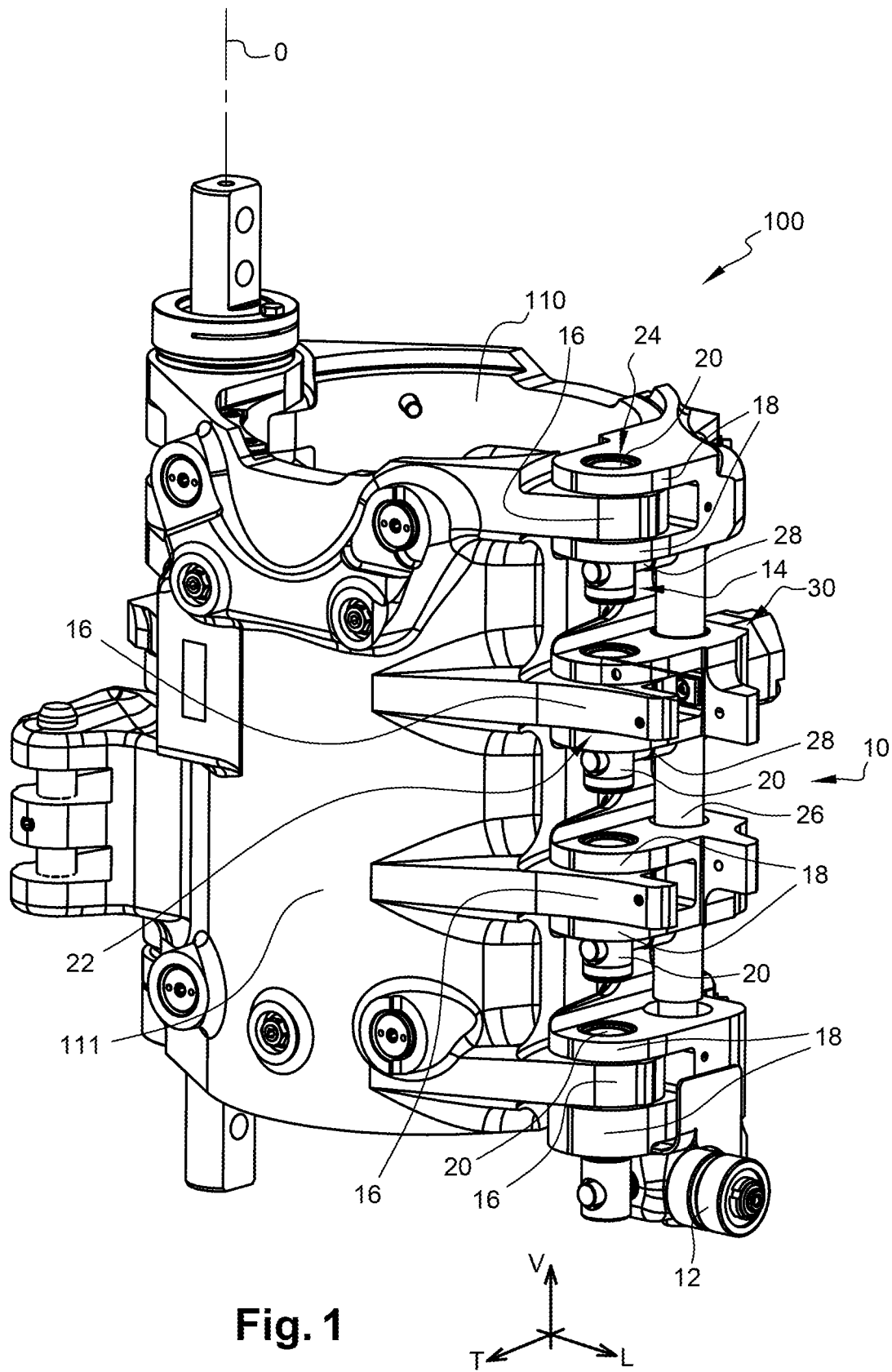
FIG. 1 is a three-quarter perspective view which represents an exemplary embodiment of a locking device of a container molding unit in closed position and which illustrates locking fingers of such a device comprising at least one sleeve according to the teachings of the invention.

FIG. 1 shows an exemplary embodiment of a locking device 10 for a unit 100 for molding containers made of thermoplastic material.

As is known, such a molding unit 100 is intended to be mounted on a carousel of a container manufacturing machine (not represented) of rotary type.

As a variant, the container manufacturing machine is of linear type.

The molding unit 100 then constitutes one of the molding stations of the machine which comprises a series of "n" molding units, distributed angularly at regular intervals around the carousel of the machine.

Each molding unit 100 comprises a mold for manufacturing containers by blow-molding or by stretch-blow-molding and from hot preforms made of thermoplastic material.

For this, the molding unit 100 comprises blow-molding or stretch-blow-molding means (not represented), and reference will for example be made to the document FR-2.764.544 for more complete details on such means.

The molding unit 100 for forming containers made of thermoplastic material by blow-molding comprises the abovementioned locking device 10, and a container molding cavity delimited at least by a first shell fixed onto a first mold-holder 110 and by a second shell fixed onto a second mold-holder 111. The second mold-holder 111 can move relative to the first mold-holder 110 between an open position and a closed position. The molding unit 100 is represented in FIG. 1, with the first mold-holder 110 illustrated on the right and the second mold-holder 111 illustrated on the left of the figures.

Preferably, the molding unit 100 is supported by a console intended to be fixed onto a frame of the molding machine.

More specifically, the mold-holders 110, 111 are constructed in the form of two supporting structures mounted to pivot about an axis O of rotation, the axis O of rotation extending here vertically according to the trihedron (L, V, T).

Each mold-holder 110 comprises articulation means (not visible) arranged at the rear, along the longitudinal line, of the molding unit 100.

Preferably, the mold-holders 110, 111 can be separated mutually from one another by pivoting about the axis O of rotation respectively between said open and closed positions.

Because of this kinematic of the mold-holders 110, 111, a molding unit 100 of this type is also called a "book-like opening" mold.

As a nonlimiting example, reference will be made to the document FR-2.843.714 which notably describes control means for controlling the opening/closing of a molding unit 100 of this type.

The locking device 10 of the molding unit 100 comprises at least one member 12 for controlling the locking means 14 of the mold-holders 110, 111.

The locking device 10 is arranged longitudinally in the front part, i.e. opposite the axis O of rotation and the means of the device for opening/closing the molding unit 100.

The locking device 10 is intended to ensure a locking of the two mold-holders 110, 111 in closed position in order to keep the molding unit 100 closed when the container is being manufactured by blow-molding or by stretch-blow-molding of a preform.

In the exemplary embodiment, the locking device 10 comprises two half-locks, respectively of male type and of female type, which are associated with the mold-holders 110, 111 and which can cooperate mutually to keep the molding unit 100 in closed position.

The function of the locking device 10 is to prohibit any opening of the mold-holders 110, 111 so as to keep the parts of the mold perfectly joined, in particular during blow-molding or stretch-blow-molding transformation operations.

The locking means 14 comprise a first half-lock secured to the first mold-holder 110, and a second half-lock secured to the second mold-holder 111. The half-locks each comprise at least one protruding branch, preferably here single branches 16 for the half-lock of the second mold-holder 111 on the left and double branches 18 for the half-lock of the first mold-holder 110 on the right.

The respective branches 16, 18 of the half-locks are directed transversely toward one another and are mutually offset vertically so that, in closed position as illustrated in FIG. 1, said branches 16 and 18 are juxtaposed, here interpenetrate.

Thus, each branch 16 is received between the two branches 18 which are positioned vertically above and below.

Each of the branches 18 of the half-lock of male type supports a locking finger 20 that slides in the vertical direction.

In other words, each of the locking fingers 20 is secured to the first mold-holder 110 and, for each locking finger 20, said locking means 14 comprise a locking opening 22 secured to the second mold-holder 111 and associated with said locking finger 20.

Each branch 16 of the half-lock of female type comprises a locking opening 22 which, extending vertically, passes through said branch 16 at its free end and each branch 18 of the half-lock of male type comprises a guiding opening 24 which, extending vertically, passes through said branch 18 at its free end.

In closed position as illustrated in FIG. 1, the openings 22 and 24 of said branches 16 and 18 are aligned in the vertical direction in order for the locking fingers 20 to be able to pass through them.

The locking device 10 here comprises a total number of four locking fingers 20, and, in a variant that is not represented, three locking fingers 20.

The locking device 10 comprises driving means 26 which are linked in displacement, here by sliding, to the locking fingers 20.

The locking means 14 are mounted to be movable between at least a locked position and an unlocked position. More specifically, the locking means 14 comprise a movable part formed by said locking fingers 20 and a fixed part formed by the branches 16 and 18 comprising said openings 22 and 24.

Advantageously, each locking finger 20 is secured to a link arm 28 which is itself secured in displacement to the driving means 26.

Figure 2:
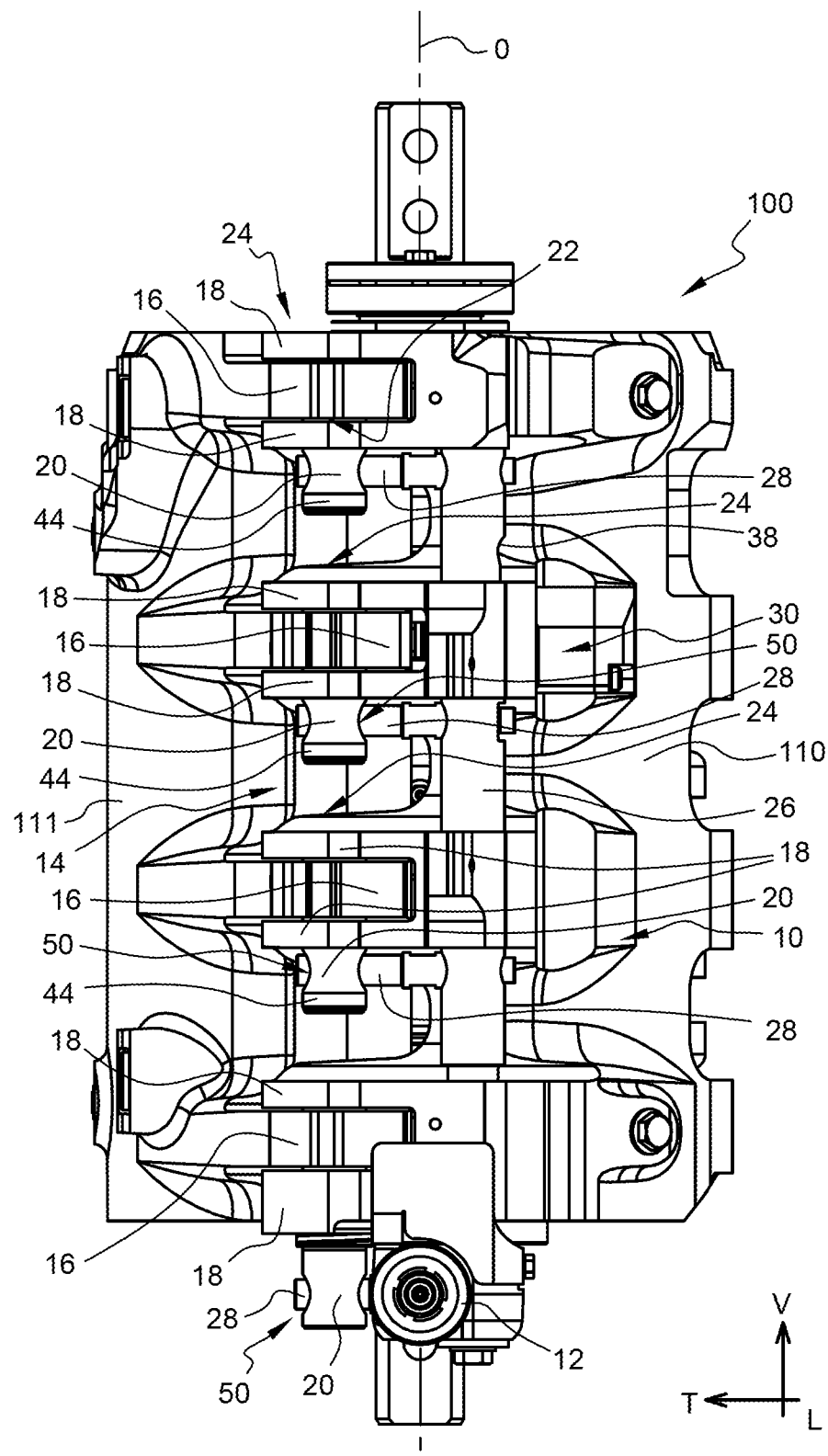
FIG. 2 is a front view which represents the container molding unit according to FIG. 1 and which illustrates the locking fingers of the device in locked position.
Figure 3:
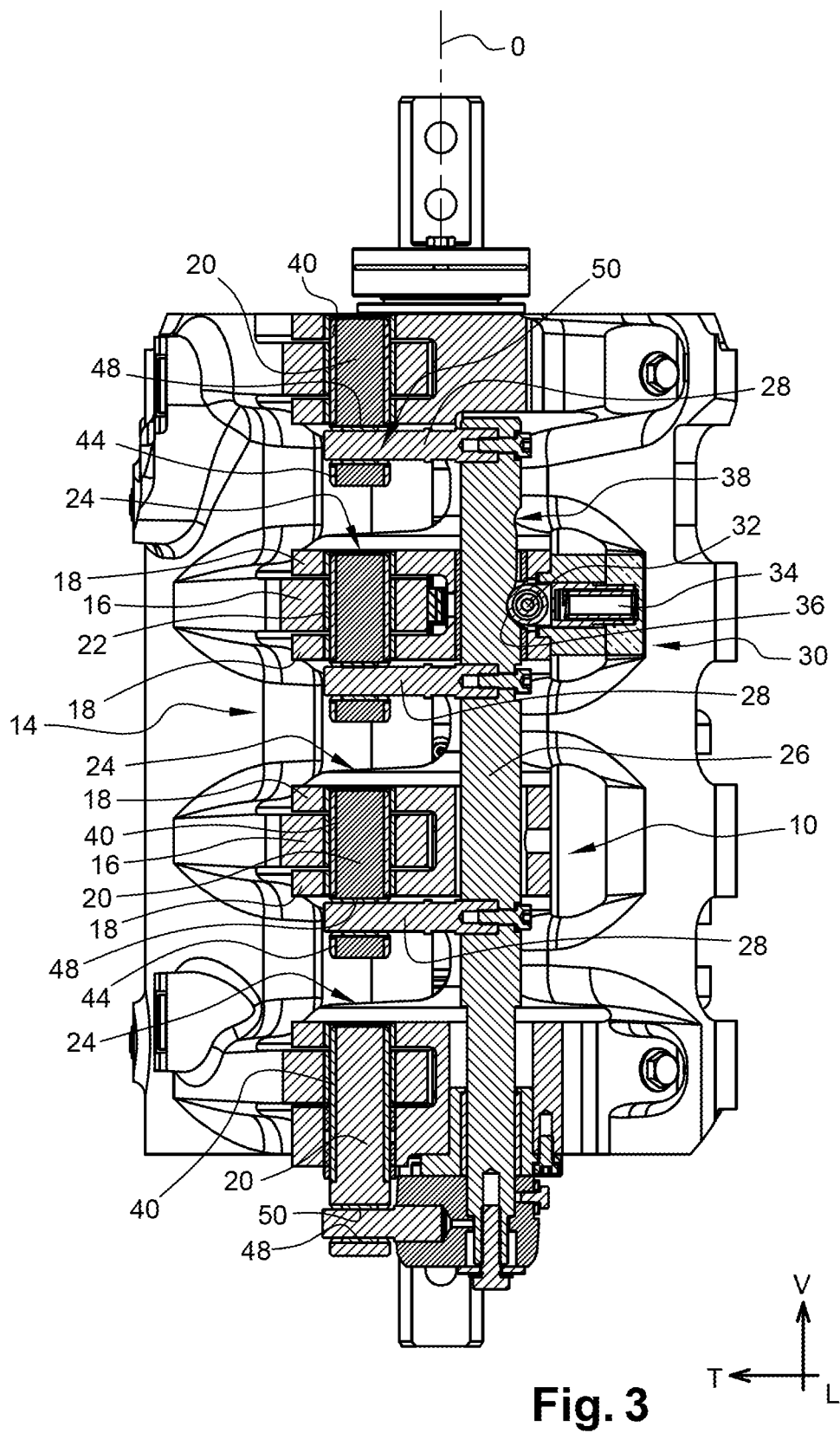
FIG. 3 is a cross-sectional view which represents the locking device of the container molding unit on a cutting plane C that can be seen in FIG. 1 and which illustrates, as in FIG. 2, the locking fingers of said device in locked position.
Figure 4:
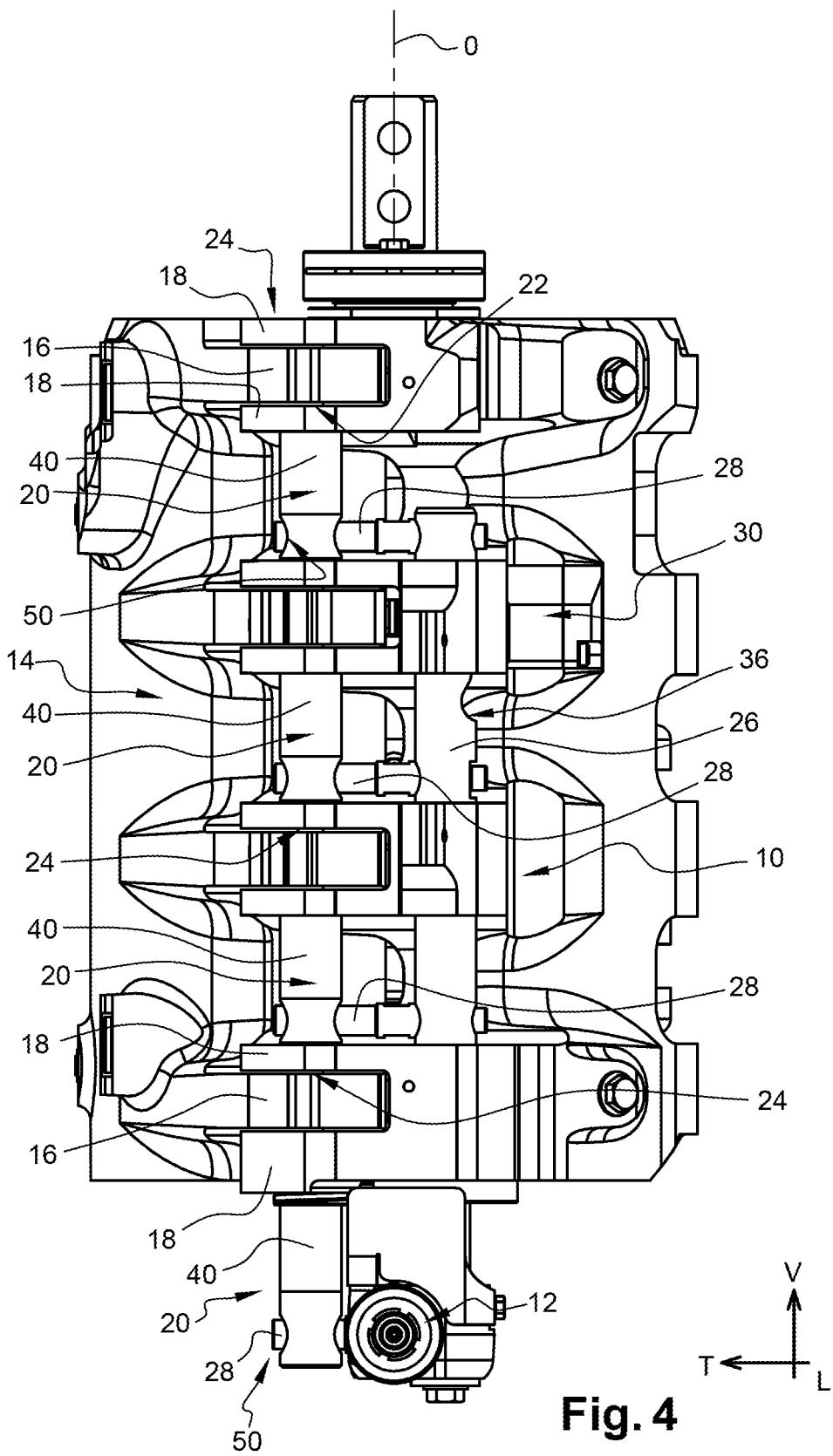
FIG. 4 is a front view which represents the container molding unit according to FIG. 1 and which illustrates the locking fingers of the device in unlocked position.
Figure 5:
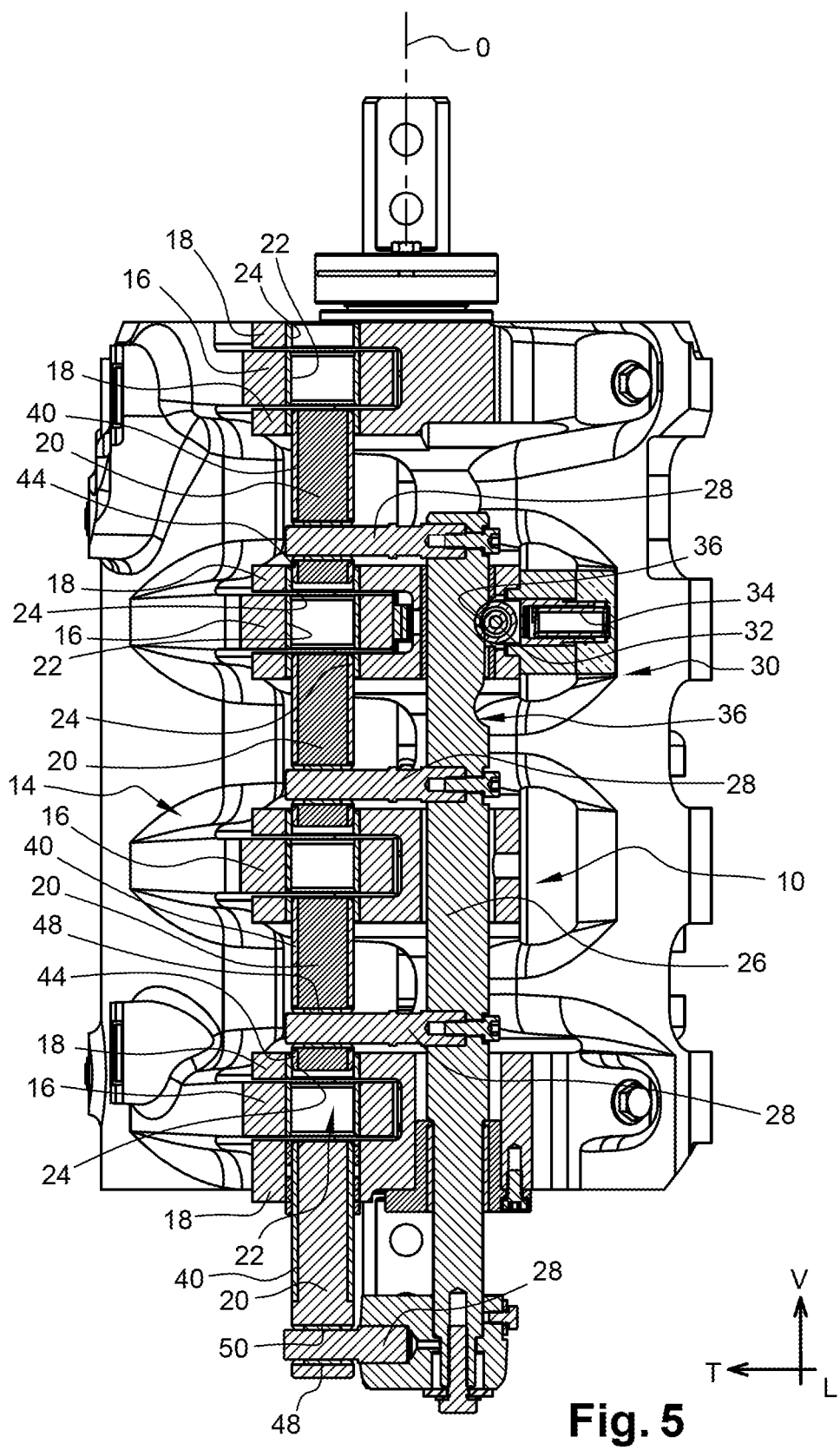
FIG. 5 is a cross-sectional view which represents the locking device of the container molding unit on a cutting plane C that can be seen in FIG. 1 and which illustrates, as in FIG. 4, the locking fingers of said device in unlocked position.
Figure 6:
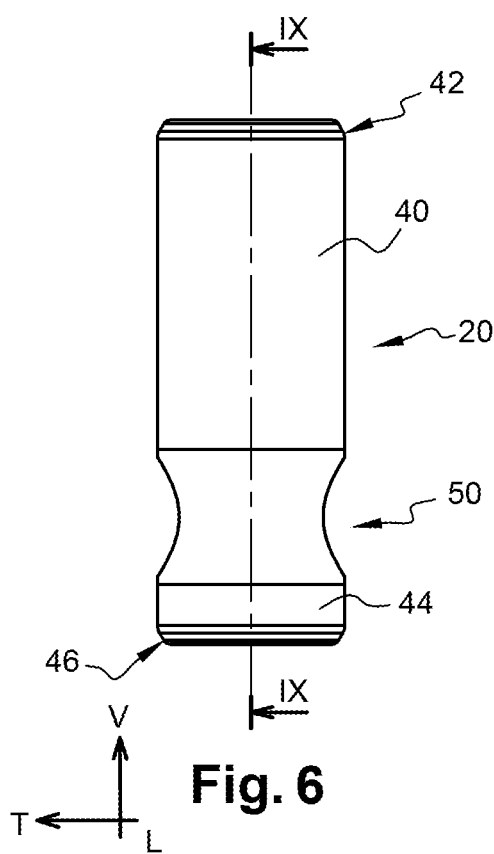
FIGS. 6 and 7 are, respectively, a front view and a cross-sectional view on a median vertical plane VII-VII of transverse orientation illustrated in FIG. 8, the views representing a locking finger for a locking device such as that of FIG. 1 which is coated with at least a main sleeve, an auxiliary sleeve and comprises an internal sleeve.
Figure 7:
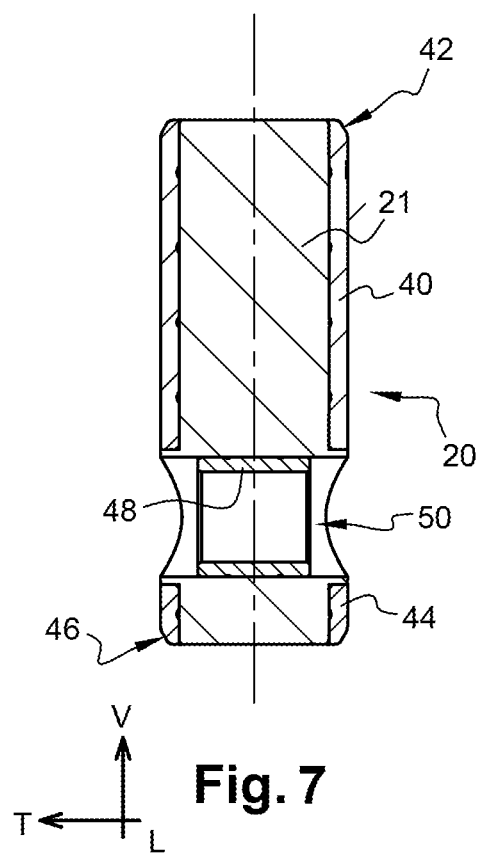
Figure 8:
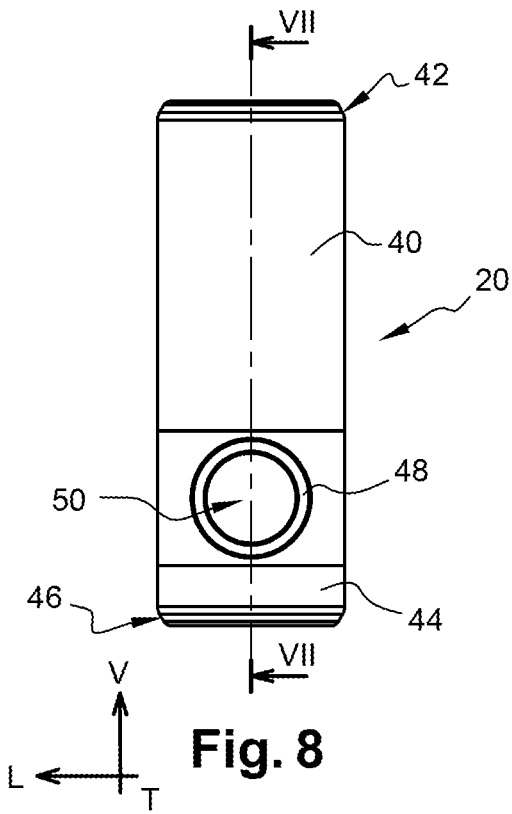
FIGS. 8 and 9 are, respectively, a side view and a cross-sectional view on a median vertical plane IX-IX of longitudinal orientation illustrated in FIG. 6, of a locking finger according to FIGS. 6 and 7 which is sleeved here by said top, bottom and internal sleeves made of composite material.
Figure 9:
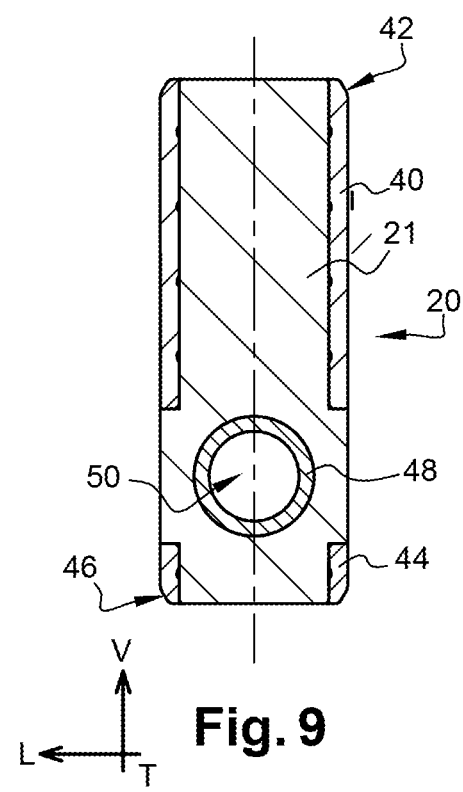
Figure 10:
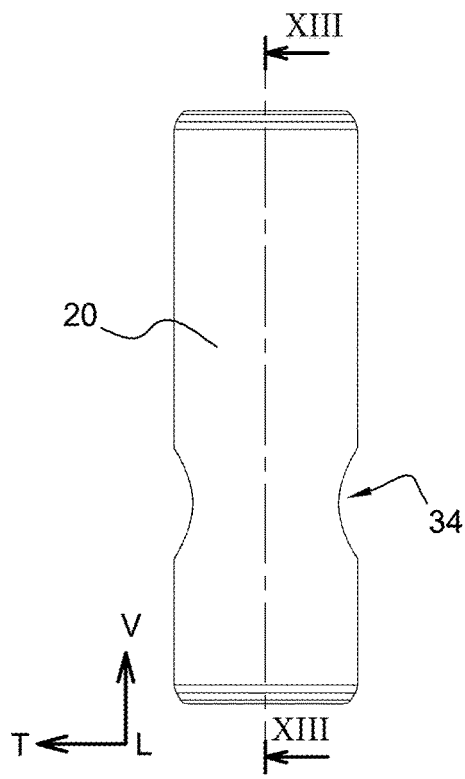
FIGS. 10 to 13 are, respectively, a side view and a cross-sectional view, respectively on a median vertical plane XI-XI of longitudinal orientation illustrated in FIG. 12, and a median vertical plane XIII-XIII of longitudinal orientation illustrated on FIG. 10, of a locking finger whose main body is made of composite material equipped with an insert.
Figure 11:
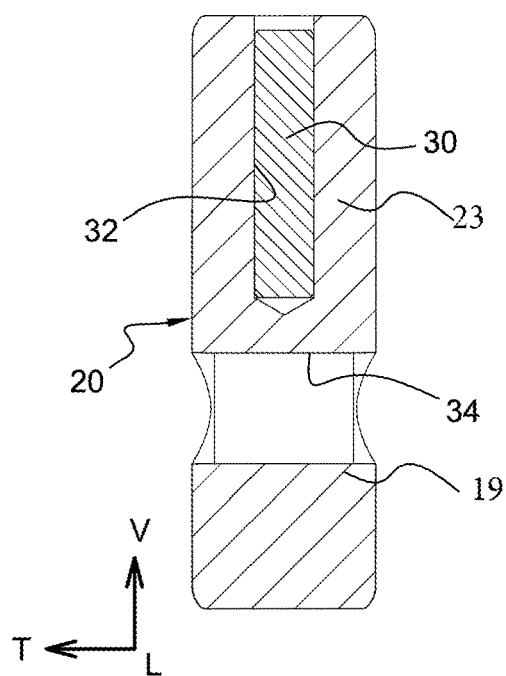
Figure 12:
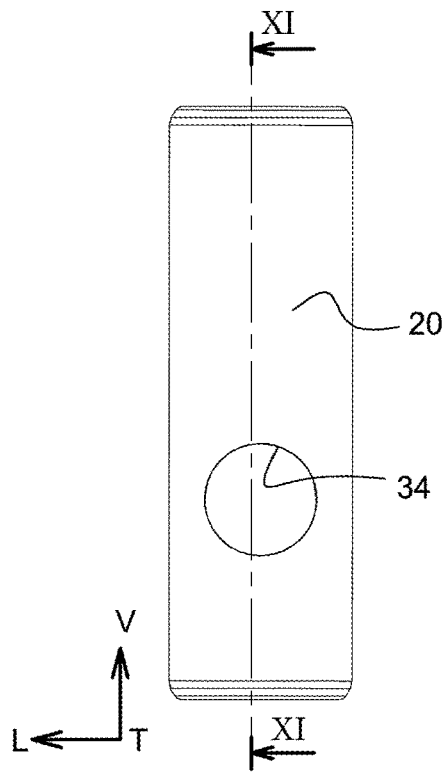
Figure 13:
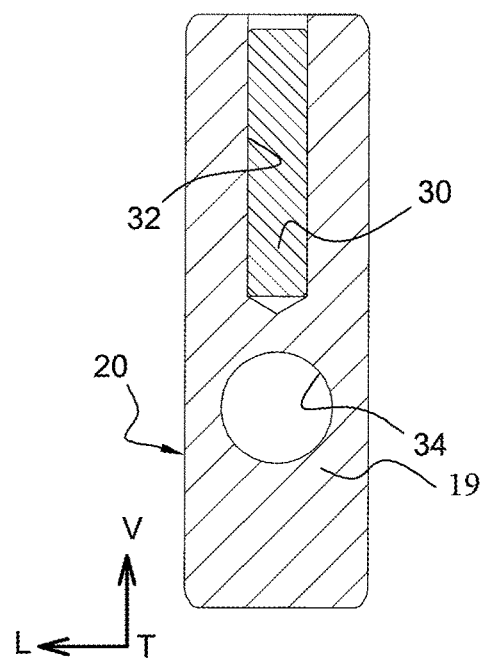

The sliding of the driving means 26 is controlled by the control member 12, respectively between the locked position (high position) represented in FIGS. 1 to 3, and the unlocked position (low position) represented in FIGS. 4 and 5.

Preferably, the control member 12 is formed by a roller which is secured to the driving means 26. The driving means 26 are, for example, composed of a shaft which extends vertically.

In the exemplary embodiment, the locking means 14 of the locking device 10 of the molding unit 100 are mounted to be movable between at least a locked position in which the mold-holders 110, 111 of the molding unit 100 are kept in closed position by said locking means 14, and an unlocked position in which the mold-holders 110 are free to be separated from the closed position to the open position.

FIGS. 2 and 3 illustrate the locking means 14 of the locking device 10 in locked position whereas FIGS. 4 and 5 illustrate them in unlocked position.

The control member 12 composed of the roller is intended to cooperate with cam means which, being complementary, can control the locking means 14 of the locking device 10 between said locked and unlocked positions.

In a variant that is not represented, the locking device 10 can comprise elastic return means which can automatically return the locking means 14 to one of said positions, advantageously to the locked position.

The elastic return means are, for example, formed by a return spring through which the shaft forming the driving means 26 passes centrally and which bears at one of its ends on a plate and at the other end on a support fixed to the driving means 26 and bearing the control member 12.

Advantageously, the molding unit 100 comprises a blocking mechanism 30 which is associated with the locking device 10.

Such a blocking mechanism 30 is notably but not exclusively used when the locking device 10 comprises such elastic return means of the locking means 14.

The blocking mechanism 30 is then intended to allow the locking means 14 to be blocked in unlocked position, said locking means 14, notably the driving means 26, being otherwise automatically returned by the elastic return means to the locked position.

In the exemplary embodiment, the blocking mechanism 30 can allow the locking means 14 to be blocked in each of the positions, respectively in locked position and in unlocked position.

The blocking mechanism 30 is more particularly visible in the cross-sectional views of FIGS. 3 and 5 which illustrate, respectively, the locking means 14 in locked position and in unlocked position.

Advantageously, the blocking mechanism 30 comprises blocking means 32, such as a slide, which can be controlled selectively between an inactive position and an active blocking position in which said blocking means 32 immobilize the locking means 14 in locked position or in unlocked position.

Preferably, the blocking means 32 are returned elastically to the active blocking position by elastic return means 34, such as a spring.

In the exemplary embodiment, the shaft forming the driving means 26 comprises a notch 36 and a notch 38 which are intended to cooperate with said blocking means 32, respectively with the notch 36 in locked position and with the notch 38 in unlocked position.

For more comprehensive details on the structure and the operation of a locking device 10 comprising a blocking mechanism 30, reference will for example be able to be made to the abovementioned document FR-2.646.802.

The rates of production of the machines for molding containers made of thermoplastic material, such as bottles made of PET, are particularly high.

In fact, depending on the number of molding units 100 of the machine and on the characteristics of the bottles being manufactured, in particular their content, the rates of production of the molding machines vary for example from approximately 20000 bph (bottles per hour) to more than 90000 bph.

Consequently, the wear resistance of the parts such as the locking fingers 20 of the locking device 10 is particularly important to guarantee the reliability of operation of the locking means 14.

Now the stresses on the locking fingers 20 are high given the repetition at such rates of successive locking and unlocking of each molding unit 100, the molding unit 100 alternating closed position and open position during the cycle of production of a container such as a bottle.

This is why solutions are sought to notably reduce the friction between each locking finger 20 and said openings 22, 24, that is to say, here respectively, with the locking opening 22 of the branch 16 and the guiding openings 24 formed in the branches 18, and to do so while limiting wear.

In fact, wear of the locking fingers 20 is also likely to provoke the appearance of play in locked position of the locking device 10 and, thereby, a separation of the parts of the mold during the production of the container as well as shear forces on the finger.

Such a play can lead, in the containers manufactured by the molding unit 100, to defects at the joint plane.

As explained in the preamble the solution known from the state of the art consists in periodically performing a lubrication of the locking fingers 20 with grease or oil in order to limit friction and subsequently the wear of the locking fingers 20.

However, such a lubrication presents many drawbacks from the soiling of the manufacturing environment by the lubricant used to the costs incurred by the lubrication interventions which necessitate the stoppage of production and human means, without also counting the purchasing of the lubrication products.

To remedy these problems, the invention proposes a novel design whereby the locking device 14 comprises at least one locking finger 20 which is a subassembly of several mechanical parts rigidly assembled with one another. The finger 20 comprises in particular a body 21 of the finger and at least a sleeve 40 made of antifriction material. Said sleeve before assembly with the main body (21) having a solid tubular part. In other words, the finger 20 of the invention is distinguished in particular from a finger which would simply be coated with a lubricating coating, or a coating having a reduced friction coefficient. In fact, the inventor has found that, surprisingly, particularly in an atmosphere with humidity that is difficult to control, but not solely, the dimensional stability of initially precise mechanical parts is controlled better than a significant thickness, resistant to wear, obtained by deposition, paint or equivalent, can be controlled.

By virtue of said at least one sleeve 40 made of antifriction composite material, a lubrication of the locking means 14 using grease or oil is avoided.

The composite material of said at least one sleeve is a material formed by several individual components, the combination of which confers on all properties that none of the components taken separately possesses.

According to a first example of composite material, the composite material is a composite material with fibers in which the fibers are embedded in a matrix formed for example by a plastic material.

A composite material with fibers is a material in which the fibers are embedded in a matrix formed by a plastic material, generally less strong than the fibers but exhibiting other properties such as, in particular, a low friction coefficient.

The fibers can be oriented to exhibit a determined angle, notably as a function of the loads, the fibers being, for example, oriented at an angle of 45°.

Preferably, the fibers used are glass fibers or carbon fibers to increase its rigidity and its resistance to shear forces.

The matrix of said composite material with fibers comprises polyetheretherketone (PEEK) or even polyetherimide (PEI).

According to an example, the composite material with fibers comprises polyetheretherketone (PEEK) which is filled with fibers such as glass fibers or carbon fibers, notably with a fiber filling of the order of 30% or 40%.

According to another example, the composite material with fibers comprises polyetherimide (PEI) which is filled with fibers such as glass fibers or carbon fibers, notably with a fiber filling of the order of 30% or 40%.

Advantageously, the composite material comprising PEI or the like is filled with solid lubricant compounds, such as polytetrafluorethylene (PTFE) or polyphenylene sulfide (PPS).

The locking device 14 according to the example comprises four locking fingers 20 each comprising at least one sleeve 40 made of composite material.

Hereinbelow, the description given for a locking finger 20 applies (unless indicated otherwise) identically for each of the fingers 20 forming the locking means 14.

Advantageously, the composite material used for said at least one sleeve 40 has a low friction coefficient by virtue of which the operations of lubrication of the locking device 10, notably of the locking means 14, are eliminated.

According to a second example of composite material, the composite material used to form said at least one sleeve is a laminated composite material.

Such a laminated composite material is manufactured from at least one fabric impregnated for example with at least one thermosetting resin and advantageously comprises at least one solid lubricant.

Said at least one fabric of laminated composite material is for example produced in the form of a filament winding.

As an example of such a laminated composite material for manufacturing said at least one sleeve, ORKOT® (registered trademark), marketed by the company Trelleborg, is advantageously used.

Different ORKOT® grades can be selected to manufacture said at least one sleeve, and nonlimiting examples that can be used include the ORKOT® grades C301 or C410.

ORKOT® is however only a nonlimiting example of composite material that can be used for said at least one sleeve.

The locking finger 20 comprises at least one sleeve 40, called top sleeve, made of composite material.

As illustrated notably in FIGS. 6 to 9, the top part of the locking finger 20 is coated on the outside with at least one top sleeve 40 made of composite material.

As illustrated in FIGS. 2 and 3 which represent the locking means 14 in locked position, the top sleeve 40 of a locking finger 20 cooperates with each of the openings 22 and 24 of said locking means 14.

In locked position, the top sleeve 40 of each finger 20 is received in the locking opening 22 of the single branch 16 and in the guiding opening 24 of each of the double branches 18.

In operation, each locking finger 20 can penetrate into said openings 22 and 24 when the locking means 14 are driven, here by sliding, from the unlocked position to the locked position and vice versa.

By virtue of the top sleeve 40 made of composite material chosen to exhibit a low friction coefficient, the fingers 20 can slide in the openings 22 and 24 without it being any longer necessary to use a lubrication as was the case previously.

Preferably, the top sleeve 40 made of composite material comprises at least one chamfer 42 or any equivalent means. The chamfer 42 is produced in a top edge of the sleeve 40 and extends circumferentially.

Advantageously, the chamber 42 of the top sleeve 40 facilitates the introduction of the free end of the locking finger 20 into said openings 22 and 24 upon the locking of the molding unit 100 by the locking device 10.

As illustrated in FIGS. 4 and 5 which represent the locking means 14 in unlocked position, said at least one locking finger 20 comprises at least one sleeve 44, called bottom sleeve, made of composite material.

The bottom sleeve 44 is arranged on the outside of the bottom part of the locking finger 20.

By comparison with the top sleeve 40, the bottom sleeve 44 intervenes not in the locked position but in the unlocked position.

In fact, and as can be more particularly be seen in the cross section of FIG. 5 illustrating the unlocked position, the bottom sleeve 44 of the locking finger 20 cooperates with the guiding opening 24 of that of the double branches 18 which, being adjacent, is situated just below.

In locked position, said opening 24 of the adjacent branch 18 cooperates with the top part of a locking finger 20 other than that whose bottom part coated with the bottom sleeve 44 which penetrates therein in unlocked position.

Preferably, the four locking fingers 20 are identical to standardize the manufacturing thereof.

Advantageously, the four locking fingers 20 thus comprise at least one top sleeve 40.

However, the fourth finger 20 of the locking means 14 which is the lowest, here situated alongside the control member 12, advantageously does not comprise a bottom sleeve 44.

In fact, and as can notably be seen in FIGS. 4 and 5, the bottom part of this locking finger 20 is not received in a guiding opening 24 in unlocked position.

Advantageously, the cooperation of the bottom end of a locking finger 20, here of the other three fingers 20, with a guiding opening 24, makes it possible to ensure an anti-torque function to avoid a rotation of the driving means 26 under the effect of centrifugal force.

By virtue of the bottom sleeve 44 that the locking fingers 20 comprise, the wear of the fingers 20, whose introduction into the guiding openings 24 is facilitated, is limited without having to make use of any lubrication.

The presence of the bottom part of at least one of the locking fingers 20 in one of the guiding openings 24 makes it possible to retain the alignment of the locking fingers 20 along the vertical line corresponding to the sliding between the locked and unlocked positions.

Failing the assurance of such an anti-torque function, the locking means 14 are likely to be subjected to damaging loads resulting from defects of alignment or of coaxiality of the locking fingers 20 with said openings 22 and 24 during locking.

In variant that is not represented, the anti-torque function is ensured by other guiding means, distinct from the locking means 14, such that the locking fingers 20 are not then configured to be inserted into a guiding opening 24 in unlocked position.

In such a variant, the bottom sleeve 44 can advantageously be eliminated.

By comparison to other means likely to be used to ensure such an anti-torque function, the fact that at least one of the fingers 20 is configured to cooperate with a guiding opening 24 in unlocked position offers advantages.

In fact, such a finger 20 makes it possible to substantially limit the mass carried on the molding unit 100 to ensure this anti-torque function and thereby to reduce the problems associated with inertia during operation.

As is more particularly illustrated by FIG. 5, the bottom part of at least one of the locking fingers 20 is configured to be inserted into the opening 24 which is situated below when the locking device 10 is maneuvered from the locked position to the unlocked position.

Advantageously, each locking finger 20 ensuring an anti-torque function comprises a bottom part coated on the outside with a bottom sleeve 44.

Preferably, the bottom sleeve 44 made of composite material comprises at least one chamfer 46 or any other equivalent means.

The chamfer 46 is produced in a bottom edge of the sleeve 44 and extends circumferentially.

Advantageously, such a chamfer 46 facilitates the introduction of the bottom sleeve 44 of the finger 20 into the guiding opening 24 during unlocking.

The chamfer 46 of the bottom sleeve 44, like the chamfer 42 of the top sleeve 40, advantageously makes it possible to also make up, in operation, tolerances and other slight defects of alignment between the locking fingers 20 and the openings 22, 24 of the branches 16, 18.

Preferably, said at least one locking finger 20 also comprises another sleeve 48, called internal sleeve, made of composite material which is housed inside an orifice 50 of the locking finger 20.

As illustrated in FIGS. 6 to 9, the orifice 50 is situated vertically between the top sleeve 40 and the bottom sleeve 44 and passes through the locking finger 20, transversely right through.

In the example, the driving means 26 are linked in displacement to said at least one locking finger 20 via the link arm 28, one end of which is secured to said driving means 26 and the other end of which is received inside said sleeve 48 made of composite material housed in the orifice 50 of the locking finger 20.

Each link arm 28 is thus secured to one end of said driving means 26 and to the other end of the locking finger 20.

Advantageously, the sleeve 48 avoids a steel/steel contact between the locking finger 20 and the link arm 28 and thereby makes it possible to eliminate any lubrication which was previously necessary at that link.

Preferably, said at least one sleeve 40, 44, 48 is force-fitted or fixed by gluing on the locking finger 20.

The locking finger 20 is preferentially made of metal, in particular of steel or a steel alloy.

Advantageously, the locking finger 20 has good mechanical properties, in particular shear strength.

According to a variant that is not represented, said at least one locking finger 20 comprises at least one recess which extends for example inward and over all or at least a part of the finger 20 so as to reduce its mass.

Preferably, said at least one recess is produced centrally in the top part of the locking finger 20.

By virtue of such a recess, the operation of a molding machine of rotary type comprising such molding units 100 is improved by limiting the problems associated with inertia and which result from the rotational driving speeds of the carousel necessary to achieve ever higher rates of production.

FIGS. 6 to 9 show in detail an exemplary embodiment of such a locking finger 20 comprising at least one sleeve made of composite material with low friction coefficient, preferentially here comprising the three sleeves 40, 44 and 48.

In the exemplary embodiment, the locking finger 20 has an overall cylindrical form.

Likewise, the top sleeve 40, the bottom sleeve 44 and the internal sleeve 48 overall have a cylindrical ring form. The three sleeves 40, 44 and 48 that the locking finger 20 comprises are tubular.

Such a locking finger 20 coated with at least one sleeve made of composite material is notably, but not exclusively, capable of being mounted in a locking device 10 of the type of that described previously with reference to FIG. 1 and subsequent figures, which locking device 10 is however given purely as a nonlimiting example.

The embodiments illustrated in FIGS. 10 to 13 will now be described. According to the preceding embodiments, the locking finger 20 comprised a main body connected to the control member 12 distinct from the sleeve made of anti-friction material. In the embodiments illustrated in FIGS. 10 to 13, the parts of the locking finger 20 produced in an anti-friction composite material comprise both a portion 23 which cooperates with the locking opening 22 and a portion 19 connected to the control member 12.

Advantageously, said composite material employed is notably a composite material with fibers or laminated composite material according to the two exemplary embodiments which have just been described.

The locking finger 20 made of anti-friction composite material is notably, but not exclusively, capable of being mounted in a locking device 10 of the type of that described previously with reference to FIG. 1 and which is given purely as a nonlimiting example.

When the locking finger 20 is made of composite material as in the first embodiment, the locking finger 20 then advantageously comprises at least one insert 30 so as to increase the shear strength of the locking finger 20.

As illustrated by the cross-sectional views of FIGS. 3 and 5, said at least one insert 30 is arranged inside the locking finger 20.

In the example illustrated in FIGS. 2 to 5, the locking finger 20 has an overall cylindrical form and the insert 30 extends along a main axis of the finger 20.

The insert 30 is arranged at the center of the locking finger 20 along said main axis and extends here in the vertical direction, that is to say in the direction of sliding of the locking finger 20 between said locked and unlocked positions.

In the exemplary embodiment, the locking finger 20 preferentially comprises a single insert 30 in the general form of a pin.

Preferably, the insert 30 is made of metal. Advantageously, the insert 30 is made of steel or a steel alloy.

The insert 30 is mounted in an internal housing 32 which is formed in the locking finger 20. The housing 32 of the insert 30 is a blind hole which is for example obtained by drilling the locking finger 20.

The insert 30 is for example force-fitted into said housing 32. As a variant, the insert 30 is fixed by gluing inside the housing 32 or by any other equivalent means that makes it possible to block it, immobilize it in position inside the housing 32.

In the exemplary embodiment, the internal housing 32 extends over at least a part of the locking finger 20.

The insert 30 extends vertically over a part of the locking finger 20 corresponding at least to the part of the finger 20 which penetrates in locked position into the openings 22 and 24 of the branches 16 and 18.

The locking finger 20 comprises an orifice 34 in which is mounted an end of the link arm 28 with the shaft forming the driving means 26. The orifice 34 is produced in the other part of the locking finger 20 not comprising said insert 30.

The housing 32 extends vertically, along the main axis of the locking finger 20, overall from the bottom one of its ends to the vicinity of the other part of the locking finger 20 comprising said orifice 34.

Each link arm 28 is thus secured at one end to said driving means 26 and at the other end to the locking finger 20.

A locking finger 20 made of anti-friction composite material has a much lower weight than that of a locking finger 20 made of steel.

A locking finger 20 according to the invention therefore makes it possible to reduce the overall weight of a molding unit 100 equipped with a locking device 10 comprising such locking fingers 20 made of composite material.

The operation of a molding machine of rotary type comprising such molding units 100 is thus also improved by limiting the problems associated with inertia and which result from the rotational driving speeds of the carousel necessary to achieve ever higher rates of production.

Advantageously, said at least one finger 20 made of composite material comprises at least one chamfer.

Preferably and as illustrated in FIGS. 2 to 5, said at least one finger 20 made of composite material comprises a chamfer formed at each of its ends, respectively top and bottom, and which extends circumferentially continuously.

Advantageously, the top chamfer facilitates the introduction of the free end of the locking finger 20 into said openings 22 and 24 upon the locking of the molding unit 100 by the locking device 10.

Advantageously, the bottom chamfer facilitates the introduction of the finger 20 into the opening 24 upon unlocking.

The invention claimed is:

1. A locking finger (20) for a molding unit, the molding unit comprising a container molding cavity delimited at least by a first shell fixed onto a first mold-holder (110) and by a second shell fixed onto a second mold-holder (111) that can move relative to the first mold-holder (110) between an open position and a closed position, the first mold-holder (110) comprising a member (12) for controlling the locking finger (20) and the second mold-holder (111) comprising a locking opening (22), the locking finger (20) comprising:
an interface (19) for mechanically coupling to the control member (12), and
a locking portion designed to cooperate with the locking opening (22) in closed position,
wherein the locking portion comprises an anti-friction composite material.

2. The finger (20) as claimed in claim 1, wherein said composite material is a composite material with fibers in which fibers are embedded in a matrix of plastic material.

3. The finger (20) as claimed in claim 2, wherein said matrix comprises at least one plastic material taken from among a group comprising polyetheretherketone (PEEK) and polyetherimide (PEI),
and/or in that said fibers are glass fibers or carbon fibers.

4. The finger (20) as claimed in claim 2, wherein the composite material is a laminated composite material comprising at least one fabric impregnated with at least one thermosetting resin,
and/or in that the composite material comprises at least one solid lubricant.

5. The finger (20) as claimed in claim 2, wherein the locking finger (20) comprises at least one internal recess which extends over at least a part of the finger (20) so as to reduce the weight thereof.

6. The finger (20) as claimed in claim 1, wherein it is a subassembly of several mechanical parts rigidly assembled with one another, including:
- a main body (21) of the finger comprising the mechanical coupling interface (19), and
- said locking portion which is a main sleeve (40) assembled on the main body (21).

7. The finger (20) as claimed in claim 6, wherein the main body (21) of the finger (20) is made of metal.

8. The finger (20) as claimed in claim 6, wherein the main sleeve (40) is disposed at a top end of the locking finger (20), the locking finger (20) comprising an auxiliary sleeve (44) made of composite material, disposed at a bottom end of the locking finger (20).

9. The finger (20) as claimed in claim 6, wherein the mechanical coupling interface (19) comprises an internal sleeve (48) made of composite material, disposed in an orifice (50) of the main body (21) of the locking finger (20).

10. The finger (20) as claimed in claim 6, wherein at least one of the sleeves taken from among: said main sleeve (40), said auxiliary sleeve (44), or said internal sleeve (48):
- has, before assembly with the main body (21), a solid tubular part.

11. The finger (20) as claimed in claim 1, wherein said locking portion and the mechanical coupling interface (19) both comprise an anti-friction composite material.

12. The finger (20) as claimed in claim 11, wherein the locking portion is a part (23) of a block made of composite material, which block also comprises the coupling interface (19).

13. The finger (20) as claimed in claim 11, wherein it comprises at least one insert (30) mounted in the part (23), notably to increase the shear strength thereof.

14. A molding unit (100) for blow-forming containers made of thermoplastic material, comprising:
- a container molding cavity delimited at least by a first shell fixed onto a first mold-holder (110) and by a second shell fixed onto a second mold-holder (111), which second mold-holder (111) can move relative to the first mold-holder (110) between an open position and a closed position,
- a control member (12) secured to the first mold-holder (110),
- at least one locking finger (20) as claimed in claim 1, each of the at least one locking finger (20) being coupled to the control member (12) by its mechanical coupling interface (19),
- wherein, for each of the at least one locking finger (20), the second mold-holder (111) comprises a locking opening (22) arranged in closed position to receive the locking portion of said locking finger (20).

15. The molding unit (100) as claimed in claim 14, wherein the control member (12) is arranged to selectively control locking means (14) between at least a locked position and an unlocked position, the locking portion cooperating with the locking opening (22) when the first (110) and second (111) mold-holders are in closed position and the locking means (14) are in locked position.

16. The molding unit (100) as claimed in claim 14, wherein the first mold-holder (110) comprises, for each locking finger, two guiding openings (24) associated with said locking finger (20), which locking finger (20) can move in translation between an unlocked position in which the locking finger (20) does not cooperate with the locking opening (22) and a locked position in which the main sleeve (40) cooperates with the locking opening (22) and with the two associated guiding openings (24), situated on either side of the locking opening (22).

17. The molding unit (100) as claimed in claim 16, wherein the locking finger (20) comprises an auxiliary sleeve (44) disposed at a bottom end of a given locking finger (20) cooperates, in unlocked position, with a guiding opening associated with a guiding finger adjacent to said guiding finger (20).

18. The finger (20) as claimed in claim 2, wherein said matrix comprises at least one plastic material taken from among a group comprising polyetheretherketone (PEEK) and polyetherimide (PEI),
and/or in that said fibers are carbon fibers with a 30% or 40% fiber filling.

19. The finger (20) as claimed in claim 6, wherein the main body (21) of the finger (20) is made of steel or a steel alloy.

* * * * *